Feb. 4, 1941. A. CALDORA Re. 21,704

HAIR CURLER

Original Filed Feb. 10, 1939

INVENTOR.
ARMAND CALDORA
BY
Richards & Geier
ATTORNEYS

Reissued Feb. 4, 1941

Re. 21,704

UNITED STATES PATENT OFFICE 21,704

HAIR CURLER

Armand Caldora, Brooklyn, N. Y., assignor of one-half to Pierre Michielli, Woodhaven, N. Y.

Original No. 2,169,021, dated August 8, 1939, Serial No. 255,584, February 10, 1939. Application for reissue May 8, 1940, Serial No. 334,680

11 Claims. (Cl. 132—33)

The present invention relates to a hair curler and particularly relates to a hair curling device to be utilized by women.

It is among the objects of the present invention to provide an inexpensive, durable and readily operated hair curling device which may be readily utilized by women either at home or in a beauty parlor with a minimum amount of manipulation and with assurance that the device may be utilized without breaking or becoming loose over long periods of time.

Still further objects and advantages will appear from the more detailed description set forth below, it being understood, however, that this more detailed description is given by way of illustration since various changes therein may be made by those skilled in the art without departing from the scope and spirit of the invention.

In accomplishing the above objects, it has been found most satisfactory to form a hair curler device of two elongated pieces of wood or of a molded synthetic resinous or plastic material, although light weight metals may also be employed preferably having a varnished surface.

In the preferred construction, the two grooved and tapered elongated elements are hingedly or pivotally connected to each other by tongue and groove connection and/or by a boss and recess connection.

The elements are normally pressed together by a spring which may be connected across the adjacent ends.

Another resilient latch device may also be provided which will engage the pivotally connected portion of the elements and have an eye at its opposite end to hold the other ends of the portions together.

In operation, the hair is usually inserted between the two elements and is then wound upon the outside thereof before or after connection of the latch device to the ends of the elements. The shanks upon which the hair is wound are tapered and grooved so as to enable more ready treatment of the hair coiled or wound thereon.

The above and other objects will appear more clearly from the following detailed description when taken in connection with the accompanying drawing, will illustrate a preferred embodiment of the inventive idea.

Figure 1:
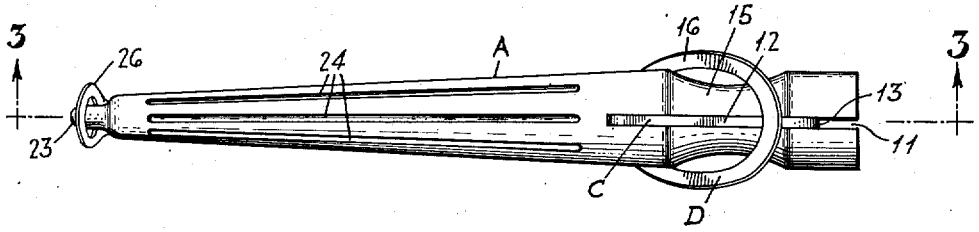
Figure 1 is a top plan view of the curler device.
Figure 2:
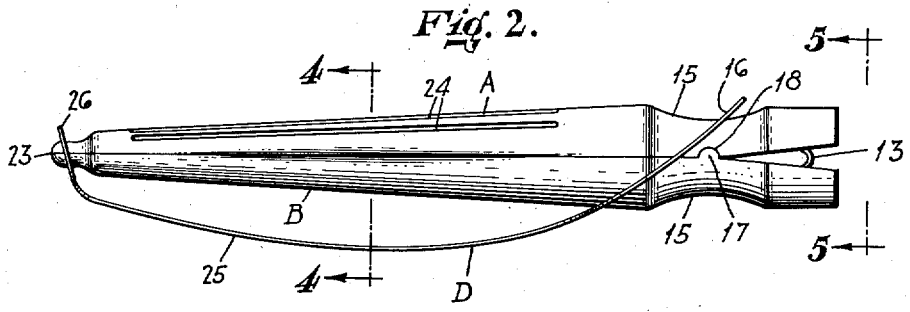
Figure 2 is a side view of the curler device.
Figure 3:
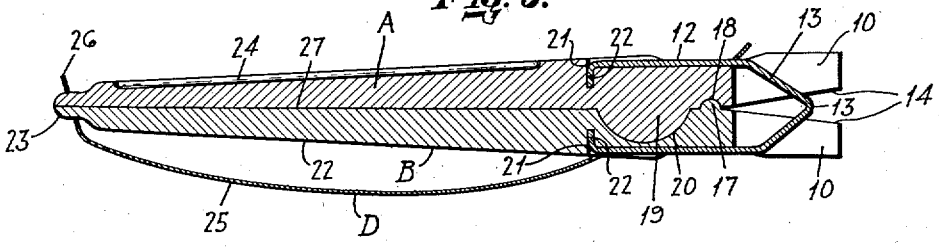
Figure 4:
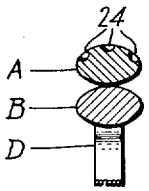

Figures 3 and 4 are respectively longitudinal and transverse sectional views upon the lines 3—3 of Figure 1 and 4—4 of Figure 2.

Figure 5:
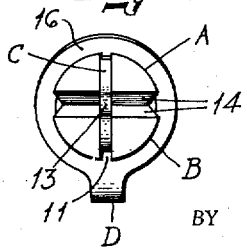

Figure 5 is an end view taken upon the line 5—5 of Figure 1.

Referring specifically to the devices shown in Figures 1 to 5, the hair curler device may be made of two elongated pieces A and B. At one end, these pieces are engaged by a bent U-shaped spring member C tending normally to press them together.

The entire device may also be held together by the latch or clip member D.

Each of the members A and B is provided with a rear extension 10, which is split at 11 to receive the legs 12 and the bent V-shaped base 13 of the U-shaped spring or resilient member C.

The extension portions 10 are also bevelled off, as indicated at 14, to enable separation of the members. The bevelled portions 14, upon contact, limit separation of the members A and B.

Adjacent the extensions 10 are the concave portions 15 which receive the ring 16 at the end of the resilient latch or clip D.

The pivotal mount is formed by placing a projection 17 upon one of the elements, for example, the element B, and a corresponding recess 18 on the other element A.

To prevent lateral movement of the elements A and B, when moved together or apart from one another, a fin 19 is provided on the upper member A to slide into a recess 20 in the lower member B.

Indentations 21 are provided in the members A and B to receive the inturned ends 22 of the U-shaped resilient member C.

Beyond the indentations 21, the longitudinal elements A and B taper toward the end portions 23. The end portions 23 are formed of reduced diameter tits or extensions from the ends of the tapered portions 22.

If desired, the upper surface of the element A may be provided with a plurality of grooves 24, which grooves may also be applied to the bottom surface of the element B.

The clip D is provided with a bowed portion 25 which terminates in a small ring 26 engaging the nipples 23 and locking the device in the manner shown in Figures 1 and 2.

In operation, the ring 26 may be disengaged from the nipples 23 and the end of a strand of hair inserted and clamped between the flat surfaces 27 of the elements A and B by the U-shaped spring member C.

Then the hair is wound upon the tapered shank portions 22. In latching the device the small eye 26 is slipped over the nipples 23. When the element D is latched into position, the hair curler device A, B, may be rotated until it is drawn up adjacent or against the scalp.

It is thus apparent the present applicant has provided a simple, inexpensive and durable hair curler device which may be readily employed by women and beauticians for curling hair.

The grooves 24 aid in the drying of the hair and in circulation of air through the coiled strand of hair, and are of substantial value.

It is apparent the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. A hair curler comprising two elongated elements positioned side by side having a pivotal connection to one another and means to hold said elements together, said pivotal connection including a transverse groove in one element and a projection closely fitting in said groove on the other element and also a longitudinally extending recess in one element and a fin extending in said recess on the other element.

2. A hair curler comprising two elongated elements positioned side by side having a pivotal connection to one another and means to hold said elements together, said means including two spring elements, one spring element engaging both ends of each of said elongated elements and the other spring engaging one end of each of said elements.

3. A hair curler comprising two elongated elements positioned side by side having a pivotal connection to one another and means to hold said elements together and means to hold said elements in alignment upon separation, said last mentioned means including an elongated longitudinally extending recess on the abutting face of one element and a fin projecting into said recess from the abutting faces of the other of said elements.

4. A hair curler comprising two elongated elements positioned side by side having a pivotal connection to one another and means to hold said elements together and means to hold said elements in alignment upon separation, said first mentioned means including two resilient elements one engaging the adjacent end portions at one end of the curler and the other engaging the adjacent end portions at both ends of the curler.

5. A curler comprising two elongated rod elements being rounded and tapered to a relatively small diameter toward one end, said rod elements having closely abutting faces, and being bevelled away from each other at the end away from said small diameter end, said abutting faces being provided with interfitting recesses and projections forming a pivotal connection between the elements and a guide and means to hold said elements together.

6. A curler comprising two elongated rod elements being rounded and tapered to a relatively small diameter toward one end, said rod elements having closely abutting faces, and being bevelled away from each other at the end away from said small diameter end, said abutting faces being provided with interfitting recesses and projections forming a pivotal connection between the elements and a guide, and a U-shaped spring pressing said elements together.

7. A curler comprising two elongated rod elements being rounded and tapered to a relatively small diameter toward one end, said rod elements having closely abutting faces, and being bevelled away from each other at the end away from said small diameter end, said abutting faces being provided with interfitting recesses and projections forming a pivotal connection between the elements, and an elongated resilient spring element having eyes engaging and encircling the ends of the elements.

8. A curler comprising two elongated rod elements being rounded and tapered to a relatively small diameter toward one end, said rod elements having closely abutting faces, and being bevelled away from each other at the end away from said small diameter end, said abutting faces being provided with interfitting recesses and projections forming a pivotal connection between the elements, and resilient means engaging said elements adjacent said pivotal connection to press said elements together.

9. A hair curler comprising two elongated tapered pivotally connected elements having a recessed cylindrical extension at the pivotal connection end, said elements being provided with resilient means to press them together and with a latch to lock them together.

10. A hair curler comprising two elongated tapered pivotally connected elements having a recessed cylindrical extension at the pivotal connection end, said elements being provided with resilient means to press them together and with a latch to lock them together, said resilient means consisting of a U-shaped spring recessed into said cylindrical extensions and engaging both of said elements.

11. A hair curler comprising two elongated tapered pivotally connected elements having a recessed cylindrical extension at the pivotal connection end, said elements being provided with resilient means to press them together and with a latch to lock them together, said latch consisting of an elongated element having eyes at each end thereof, one eye engaging said recessed cylindrical extension and the other engaging the opposite end of the curler.

ARMAND CALDORA.